(12) United States Patent
Dewey et al.

(10) Patent No.: US 6,361,263 B1
(45) Date of Patent: Mar. 26, 2002

(54) APPARATUS AND METHOD OF INVENTORYING PACKAGES ON A STORAGE DEVICE

(75) Inventors: Paul Dewey, Poway; Brian L. Ganz, Carlsbad; Erik Barnes, San Diego, all of CA (US)

(73) Assignee: Pyxis Corporation, San Diego, CA (US)

( * ) Notice: Subject to any disclaimer, the term of this patent is extended or adjusted under 35 U.S.C. 154(b) by 0 days.

(21) Appl. No.: 09/459,200

(22) Filed: Dec. 10, 1999

Related U.S. Application Data (60) Provisional application No. 60/111,902, filed on Dec. 10, 1998.

(51) Int. Cl.[7] .............................................. B65G 47/00
(52) U.S. Cl. .................. 414/331.05; 198/349; 198/676; 198/467.1; 414/800
(58) Field of Search .............................. 198/467.1, 676, 198/349; 414/273, 274, 331.05, 800

(56) References Cited

U.S. PATENT DOCUMENTS

| | | | | | |
|---|---|---|---|---|---|
| 4,995,531 A | * | 2/1991 | Summers | ............. | 198/467.1 X |
| 5,799,769 A | * | 9/1998 | Heer | ............................ | 198/349 |
| 5,967,730 A | * | 10/1999 | Peroni | ................. | 198/467.1 X |

* cited by examiner

Primary Examiner—Steven A. Bratlie
(74) Attorney, Agent, or Firm—Michael D. Steffensmeier (57) ABSTRACT

The present invention relates to a method and apparatus for inventorying packages on a storage device which consists of removing packages from the storage device with a variable pitch inventory screw, scanning a surface of the packages to read indicia on the surface and recording information obtained from the indicia about the contents in the packages. The present invention enables users to quickly and efficiently scan and store packages of items hanging on a lead screw in a centralized storage/retrieval system.

11 Claims, 9 Drawing Sheets

FIG-9

APPARATUS AND METHOD OF INVENTORYING PACKAGES ON A STORAGE DEVICE

RELATED APPLICATIONS

This application claims priority to Provisional Patent Application Ser. No. 60/111,902 entitled: VARIABLE PITCH LEAD SCREW FOR TRANSFERRING MATERIALS HANGING THEREFROM, filed Dec. 10, 1998.

BACKGROUND OF AND SUMMARY OF THE INVENTION

The present invention consists generally of a method and apparatus for inventorying articles on a storage device by use of a lead screw. The present invention includes various embodiments using a lead screw, including using a variable pitch screw consisting of a metal rod with a machined helical trough of a uniquely varying pitch used for the purpose of linearly propagating hanging packages while varying the distance with respect to each other. One preferred embodiment of the present invention enables a user to quickly and efficiently scan and store packages of medication hanging on a lead screw in a centralized storage/retrieval system.

Screws for package transfer have been designed with a single pitch which is constant along its entire length. A problem with such a design is that the packages are held too close together to allow the front surface of the packages to be scanned by a bar code reader. The present invention solves this problem by various embodiments, including a preferred embodiment of varying the pitch of the screw to turn the surface of the packages toward the side so a surface of the package can be scanned by a bar code reader. The advantage to this is that it allows the front surface of the packages to become visible one at a time while still allowing the packages to remain hanging close together for compact storage.

The present invention includes a method of inventorying packages on a storage device, comprising the steps of: removing the packages from a storage device with a screw by rotating the screw by its axis so that the end of the screw enters holes in the packages to withdraw the packages from the storage device between threads of the screw; scanning a surface of the packages to read indicia (such as bar codes) on the surfaces; and recording information obtained from the indicia on the packages.

Various objects and advantages of the present invention will become apparent from the following detailed description when viewed in conjunction with the accompanying drawings, which set forth certain embodiments of the invention.

DETAILED DESCRIPTION OF THE PREFERRED EMBODIMENTS

The detailed embodiments of the present invention are disclosed herein. It should be understood, however, that the enclosed embodiments are merely exemplary of the invention, which may be embodied in various forms. Therefore, the details disclosed herein are not to be interpreted as limiting, but merely as a basis for teaching one skilled in the art how to make and/or use the invention.

Figure 1:
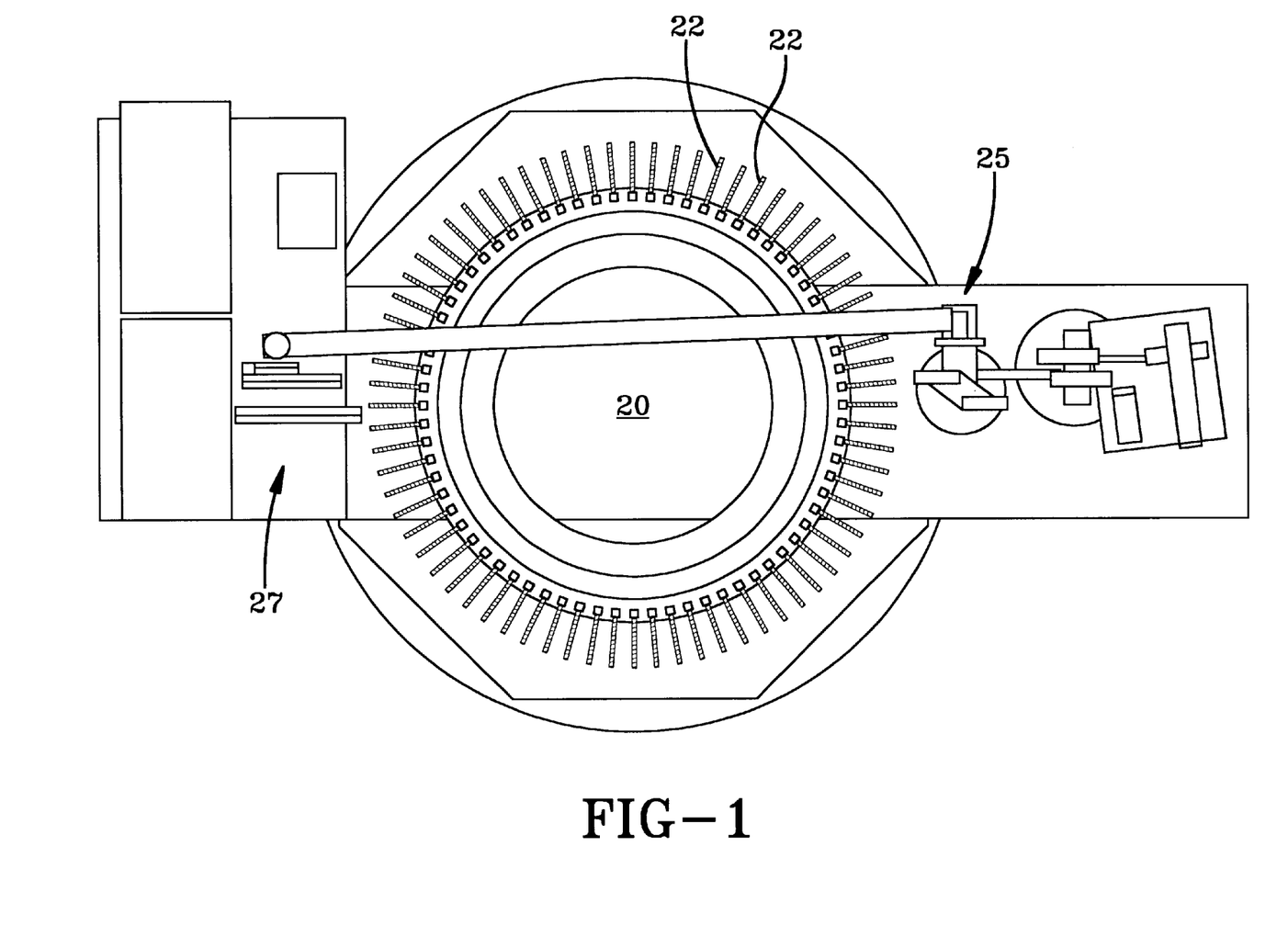
FIG. 1 is a plan view of a package storing device in accordance with a preferred embodiment of the present invention.

The method and apparatus of the present invention is for inventorying packages on a storage device that has stored thereon, a plurality of packages that may contain various types of articles, including, but not limited to, drugs, syringes, bottles, and any other types of articles that may be included in packages. An example of a storage device 20 that contains packages of such items is shown in FIG. 1. The central storage and retrieval device 20 includes a number of screws 22 that extend radially outward from the center of the storage and retrieval device 20. Each of the storage device screws 22 may contain packages hanging in the troughs between the threads of the screws 22.

Such a storage and retrieval device 20 is described in greater detail in U.S. patent application Ser. No. 09/087,067, which is hereby incorporated by reference herein. Other devices 25 and 27 that load or unload the storage and retrieval device 20 may also have screws to move packages. The invention has usefulness in a broad range of applications in many industries. In a preferred system, the present invention may be used to transfer medications contained in unit-dose packages having bar codes on each package representing information about the contents of each package. The storage and retrieval device 20 is a storage system, as well as a means to transfer packages from one point to another.

Figure 2:
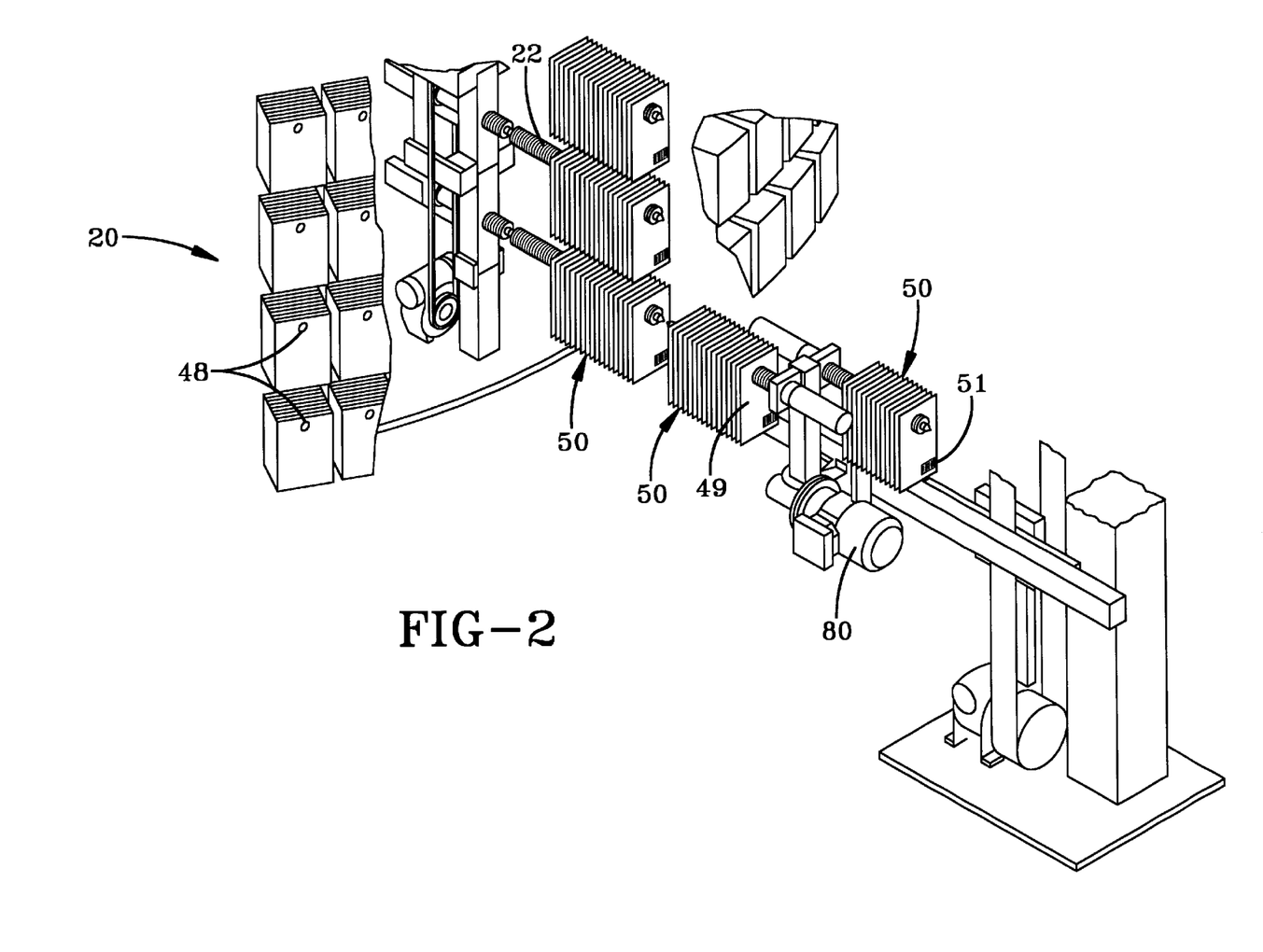
FIG. 2 shows a perspective view of packages stored on screws on a storage device.

The storage and retrieval device 20 is based on using each trough between the threads of an ACME threaded screw as a separate storage location. The storage device preferably has seventy two (72) screws (or stations) each with twenty (20) troughs (for a total of One Thousand Four Hundred Forty (1440)) on each level of the storage device. Preferably, up to eleven (11) levels (for a total of Fifteen Thousand Eight Hundred Forty (15,840) separate storage locations) may be required to provide sufficient storage capacity for a large user (see FIG. 2). Each of these storage locations are preferably random access, and the storage device content information is maintained in a database with the record address being the tower level, the station number and the position within the station (trough on the screw).

Good business practice requires a regular audit of inventory. As machine availability is critical to the user, each inventory check would need to be accomplished in as efficient a manner as possible. The inventory process may require that the packages of each screw of the storage device 20 be removed, the face of the packages be read or scanned to determine contents, then the packages be replaced on the screw and a database updated to reflect the current contents for that screw or rod. The process may be repeated for each screw on the storage device 20, updating the inventory database. When the audit process is complete, the newly updated database may be used to return the system to online status, and be compared with the pre-inventory database to search for errors. Other storage and retrieval devices that have packages on them, including devices that use smooth rods holding packages hanging therefrom, can also be inventoried with the present invention.

Figure 6:
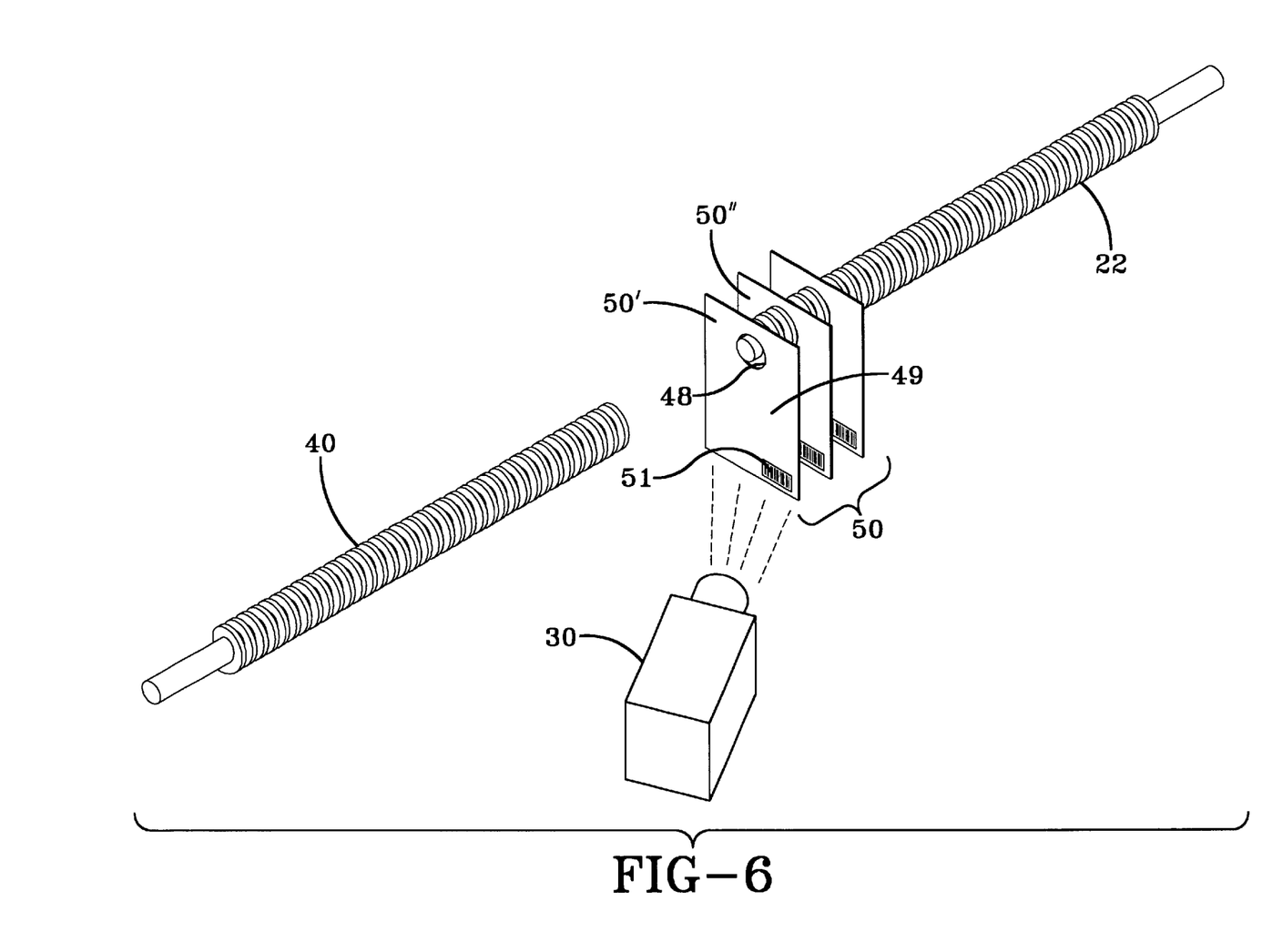
FIG. 6 shows a perspective view of an inventory screw removing packages from a storage device screw while the front package is getting scanned in accordance with a preferred embodiment of the present invention.
Figure 7:
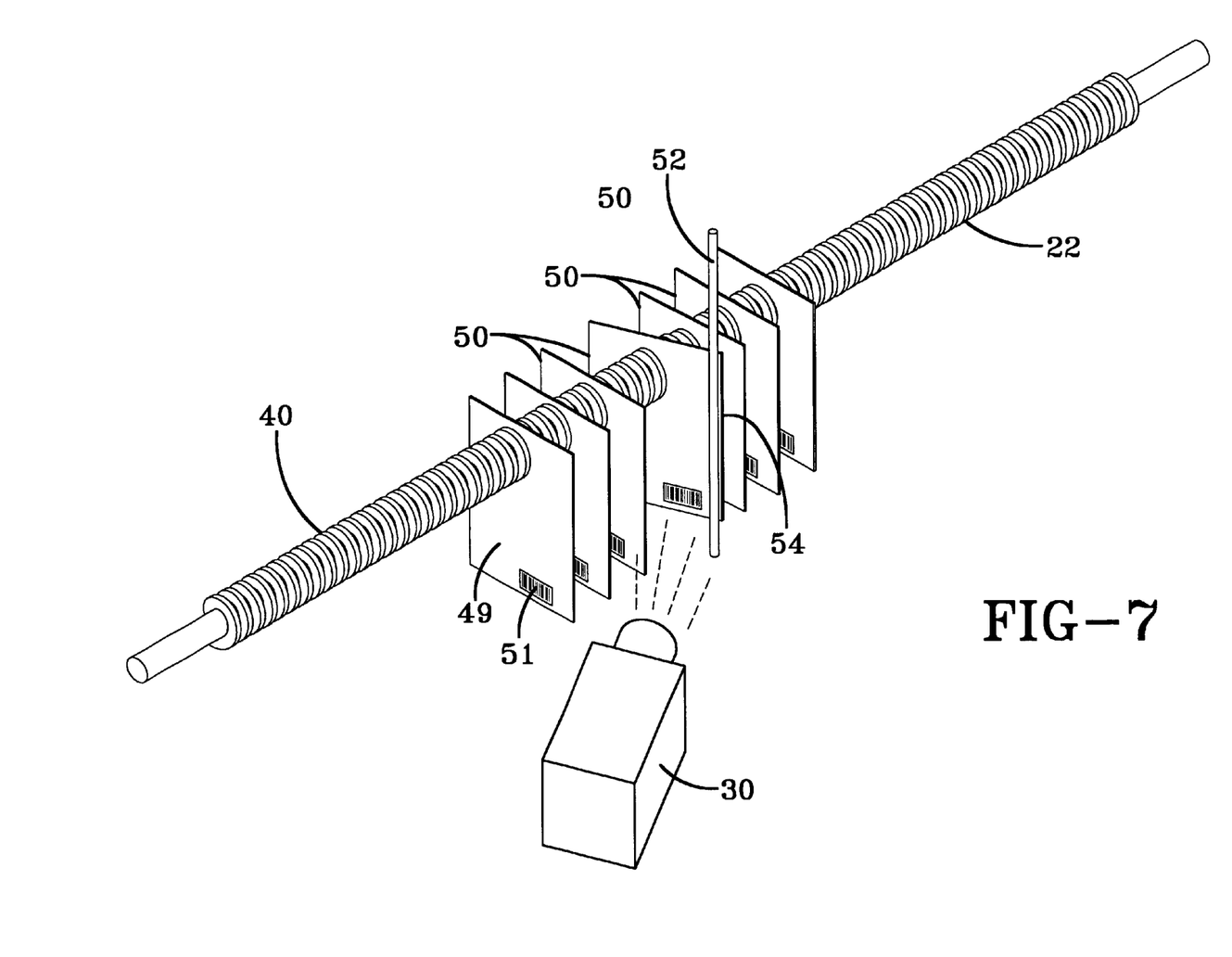
FIG. 7 shows a perspective view of an inventory screw removing packages from a storage device screw in accordance with another preferred embodiment of the present invention.
Figure 8:
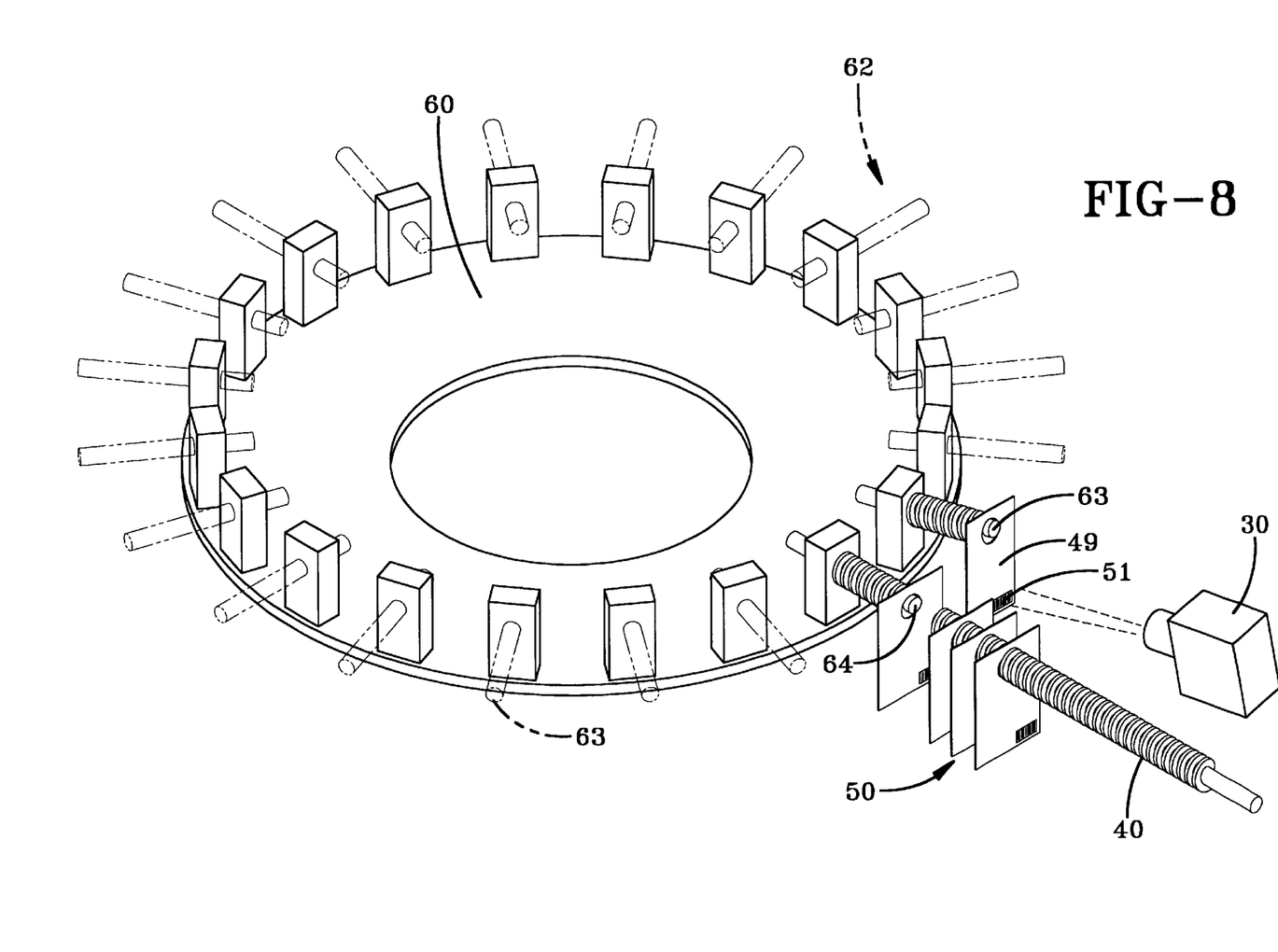
FIG. 8 shows a perspective view of another embodiment of the present invention.

As shown in FIGS. 6–8, the present invention allows the packages on various types of storage devices to be inventoried by removing the packages from the storage devices with an inventory screw 40 that rotates about its axis and the end of the screw enters holes 48 in the packages 50 to withdraw the packages 50 from the storage device 20 between threads of the screw 40. As used herein, the screws 22 and 40 may be a helix or spiral. The screw 40 is rotated about its axis by a suitable motor 80 (see FIG. 1) connected to the screw 40. The present invention allows for a surface 49 of the package(s) 50 to be scanned by a scanner 30, such as a bar code reader, to read indicia 51 (e.g., bar codes) on the surfaces 49 of the packages 50, and records the information obtained from the indicia 51 on the packages 50. This information may be sent from the scanner 30 to a computer or other recordation or memory device (not shown). The present invention also enables the packages 50 to be returned to the storage device 20 after the appropriate information has been obtained from the indicia 51 on the packages 50. This is typically done by rotating the screw 40 about its axis, in the opposite direction that the screw 40 was rotated to withdraw the packages 50 from the storage device 20.

The process of removing, scanning, recording information about the contents in the packages 50 and replacing the packages 50 back on the storage device 20 may be accomplished in a variety of ways in accordance with the present invention. In one embodiment (see FIG. 6), a scanner 30 (scanning head, camera or other scanning device that can read indicia 51 such as bar code labels) is attached to the inventory screw 40. The inventory screw 40 may be moved to a storage device screw 22, and the outermost package 50' may be scanned. One may then pick the package 50' with the inventory screw 40 (moving the second package 50" to the outermost location), scan the then outermost package 50" with the scanner 30, then pick package 50" with the inventory screw 40, and so forth, to scan each of the packages 50 that were on the storage device screw 22. This may be repeated for the remainder of the packages 50 of the storage device 20. Each separate package 50 will be held on a separate trough between the threads of the inventory screw 40. When the storage device screw 22 is empty and each of the packages on that screw 22 are scanned and the scanned data is recorded, the packages 50 may be moved from the inventory screw 40 back onto the storage device screw 22 by rotating both the inventory screw 40 and the storage device screw 22 together so that the packages 50 will move from the inventory screw 40 back onto the storage device screw 22 in the same order and with the same spacing as before. This may be repeated for the balance of the storage device.

In another embodiment, shown in FIG. 7, one may unload the storage device screw 22 onto the inventory screw 40, driving an edge 54 of each of the packages 50 against an obstruction 52 to thereby fan out each of the packages 50 so that a surface 49 of the packages 50 is exposed to be scanned by the scanner 30, as the packages 50 are moved along the inventory screw 40 and the loading device screw 22. The obstruction 52 could be a pin, rod, or any other type of obstruction that would turn the surface 49 of the package towards the scanner 30 so that the indicia 51, such as a bar code, can be scanned by the scanner 30.

In yet another embodiment, shown in FIG. 8, a turntable 60 is provided with a plurality of screws 62. The turntable 60 may be positioned near a storage and retrieval device 20 that has packages 50 to be inventoried. The packages 50 are unloaded from the storage device screw 22, onto the inventory screw 40 shown in FIG. 8. The inventory screw 40 will then be moved to mate with the end 63 of the screw 62 of the turntable 60. Once the end 64 of the inventory screw 40 mates with the end 63 of one of the screws 62 and 40 will rotate together to move a package 50 from the inventory screw 40 onto screw 62. The turntable 60 will be rotated so that the end 63 of the next screw 62 will mate with the end 64 of the inventory screw 40 so that the next package 50 on the inventory screw 40 can be loaded onto screw 62 of turntable 60. A scanner 30 is provided to scan the surface 49 of the packages 50 as they are positioned in front of the scanner 30 so that the scanner 30 can read indicia 51, such as bar code labels, on the packages 50. When the first package 50 to be unloaded returns to the inventory screw 40 location, it is reloaded onto the inventory screw 40, as are all subsequent packages 50. The information that was scanned from the packages 50 is transferred from the scanner 30 to a database (not shown). The inventory screw 40 will then load the packages 50 back onto the storage device screw 22.

Figure 3:
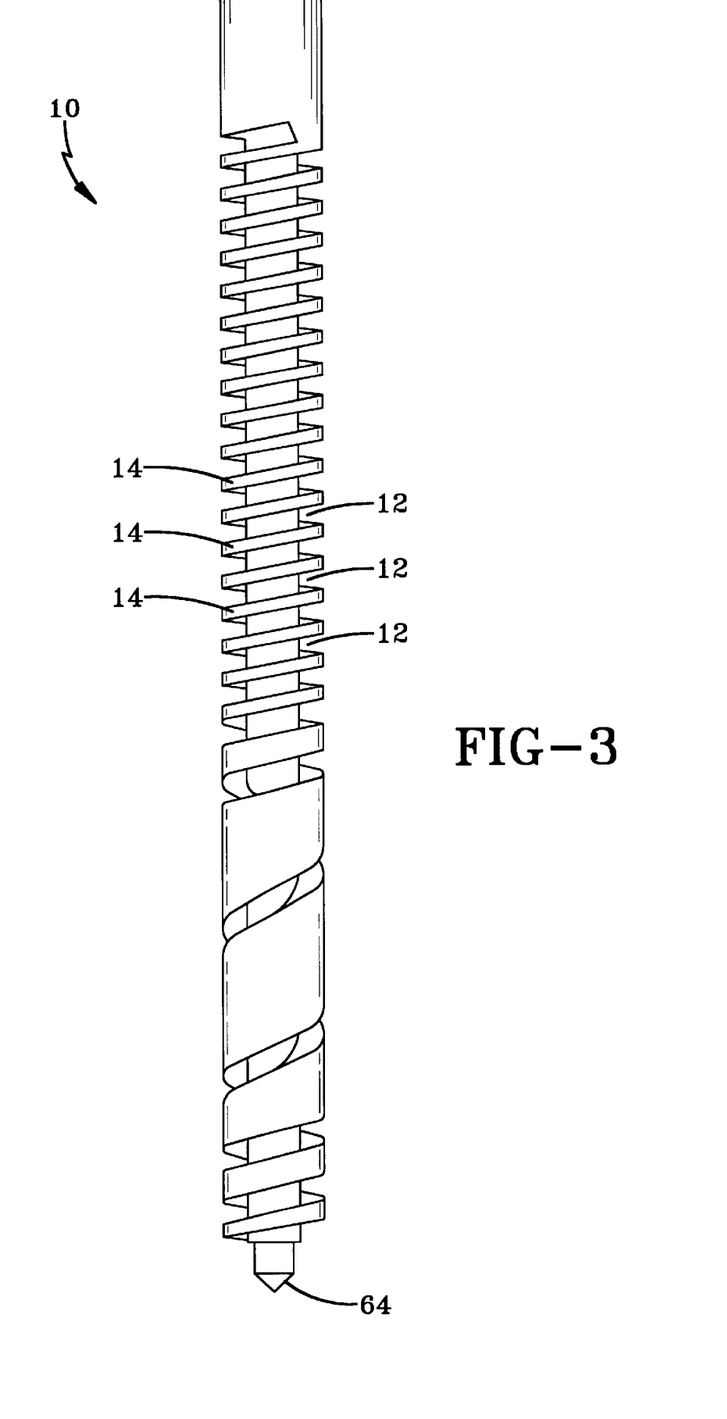
FIG. 3 is a side view of the variable pitch inventory screw in accordance with the present invention.
Figure 4:
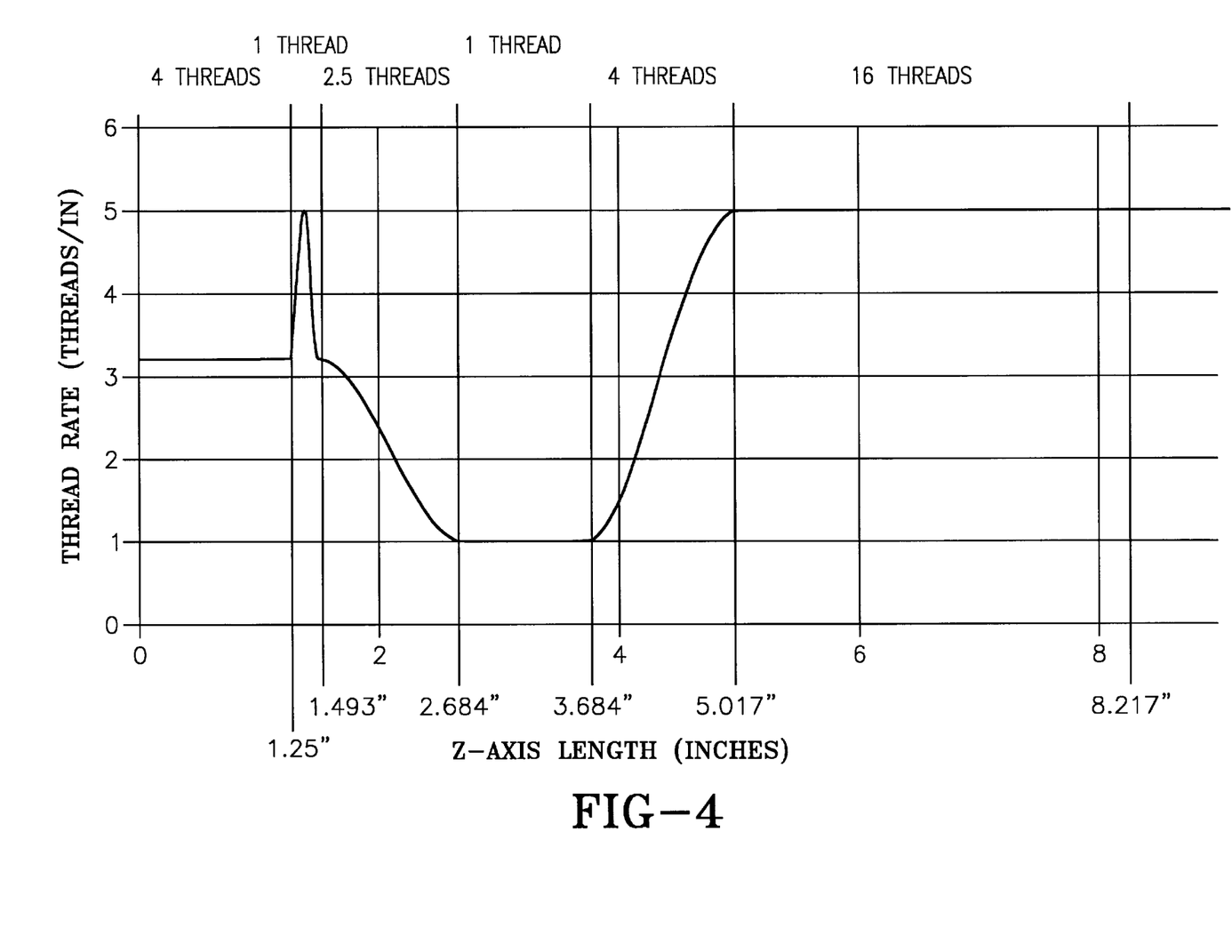
FIG. 4 is a chart of the variable pitch screw in accordance with the present invention.
Figure 5:
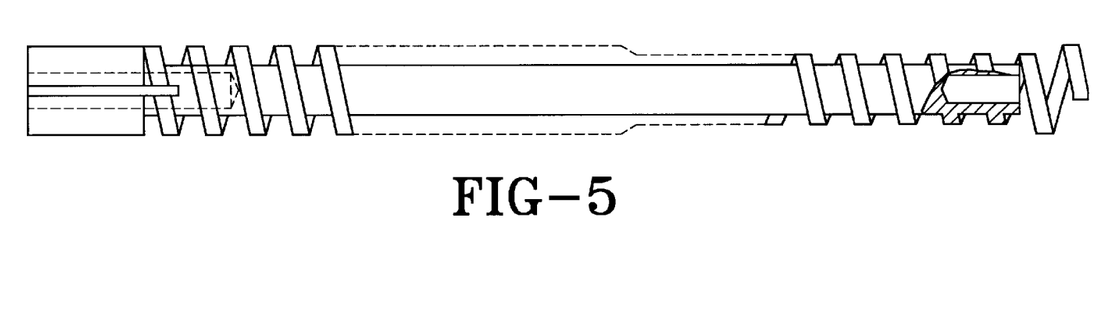
FIG. 5 is a side view of an inventory screw in accordance with the present invention.
Figure 5A:
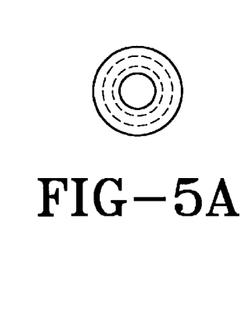
FIG. 5A is an end view of the screw shown in FIG. 5.
Figure 9:
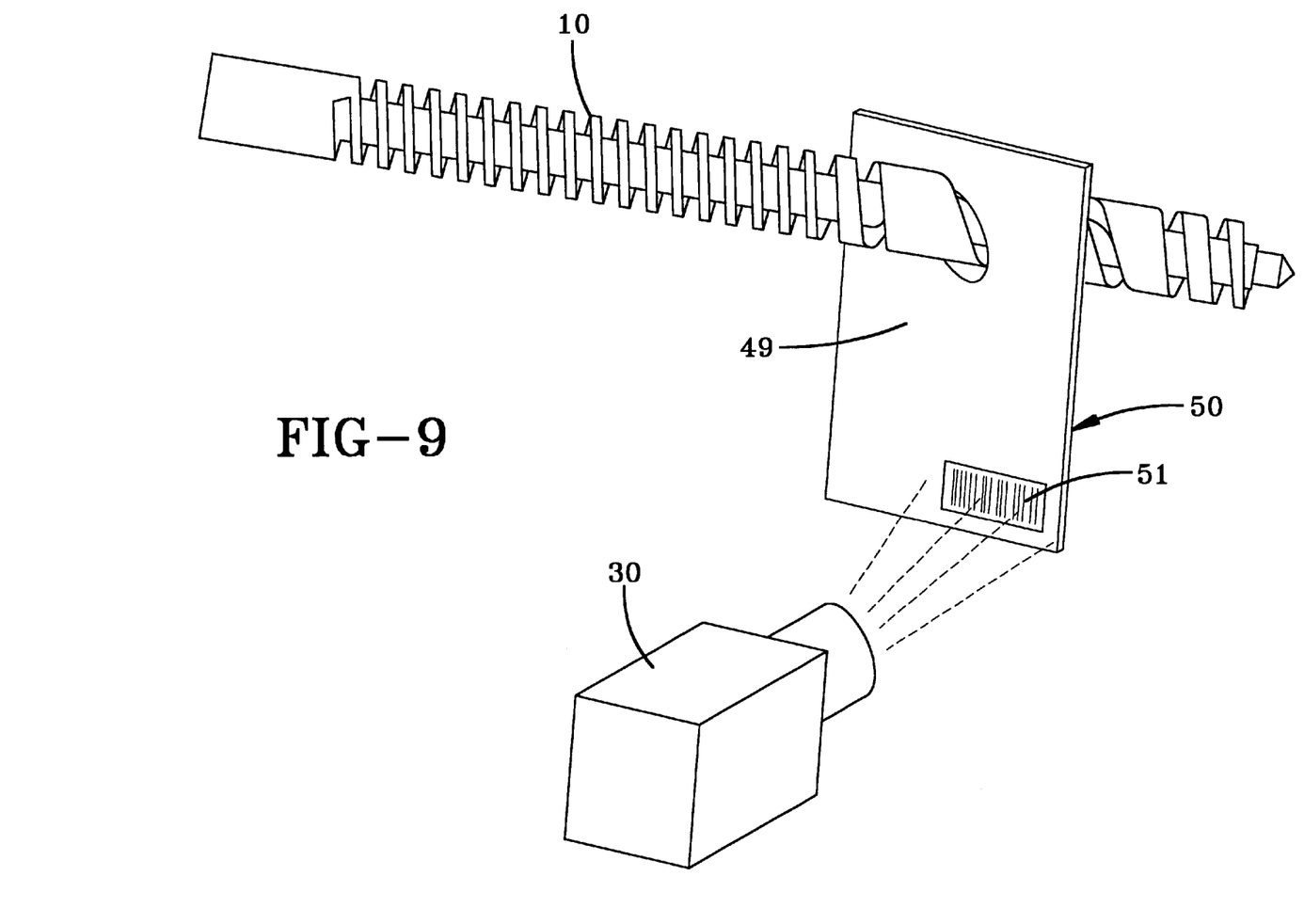
FIG. 9 shows a perspective view of a variable pitch inventory screw enabling packages to be scanned in accordance with a preferred embodiment of the present invention.

In the preferred embodiment, the inventory screw 40 is a variable pitch screw 10 such as that shown in FIGS. 3–4 and 9. The variable pitch inventory screw 10 preferably is a machined aluminum lead screw with a variable pitch trough 12 between the threads 14. Table 1 shows a variable pitch table for the variable pitch inventory screw 10 of FIG. 3.

TABLE 1

Variable Pitch Thread

| X-axis (inches) | Thread Rate (threads/in) |
|---|---|
| LEAD IN | |
| 0.0000 | 3.2000 |
| 0.0500 | 3.2000 |
| 0.1000 | 3.2000 |
| 0.1500 | 3.2000 |
| 0.2000 | 3.2000 |
| 0.2500 | 3.2000 |
| 0.3000 | 3.2000 |
| 0.3500 | 3.2000 |
| 0.4000 | 3.2000 |
| 0.4500 | 3.2000 |
| 0.5000 | 3.2000 |
| 0.5500 | 3.2000 |
| 0.6000 | 3.2000 |
| 0.6500 | 3.2000 |
| 0.7000 | 3.2000 |
| 0.7500 | 3.2000 |
| 0.8000 | 3.2000 |
| 0.8500 | 3.2000 |
| 0.9000 | 3.2000 |
| 0.9500 | 3.2000 |
| 1.0000 | 3.2000 |
| 1.0500 | 3.2000 |
| 1.1000 | 3.2000 |
| 1.1500 | 3.2000 |
| 1.2000 | 3.2000 |

TABLE 1-continued

Variable Pitch Thread

| X-axis (inches) | Thread Rate (threads/in) |
|---|---|
| 1.2500 | 3.2000 |
| SECTION 1 | |
| 1.2500 | 3.2000 |
| 1.2600 | 3.2302 |
| 1.2800 | 3.4597 |
| 1.3000 | 3.8589 |
| 1.3200 | 4.3235 |
| 1.3400 | 4.7325 |
| 1.3600 | 4.9791 |
| 1.3800 | 4.9989 |
| 1.4000 | 4.7869 |
| 1.4200 | 4.3983 |
| 1.4400 | 3.9344 |
| 1.4600 | 3.5164 |
| 1.4800 | 3.2532 |
| SECTION 2 | |
| 1.4933 | 3.2000 |
| 1.5000 | 3.1998 |
| 1.5500 | 3.1877 |
| 1.6000 | 3.1567 |
| 1.6500 | 3.1073 |
| 1.7000 | 3.0404 |
| 1.7500 | 2.9571 |
| 1.8000 | 2.8590 |
| 1.8500 | 2.7476 |
| 1.9000 | 2.6250 |
| 1.9500 | 2.4933 |
| 2.0000 | 2.3547 |
| 2.0500 | 2.2117 |
| 2.1000 | 2.0668 |
| 2.1500 | 1.9224 |
| 2.2000 | 1.7811 |
| 2.2500 | 1.6454 |
| 2.3000 | 1.5176 |
| 2.3500 | 1.3998 |
| 2.4000 | 1.2943 |
| 2.4500 | 1.2028 |
| 2.5000 | 1.1269 |
| 2.5500 | 1.0678 |
| 2.6000 | 1.0268 |
| 2.6500 | 1.0044 |
| SECTION 3 | |
| 2.6838 | 1.0000 |
| 2.7000 | 1.0000 |
| 2.7500 | 1.0000 |
| 2.8000 | 1.0000 |
| 2.8500 | 1.0000 |
| 2.9000 | 1.0000 |
| 2.9500 | 1.0000 |
| 3.0000 | 1.0000 |
| 3.0500 | 1.0000 |
| 3.1000 | 1.0000 |
| 3.1500 | 1.0000 |
| 3.2000 | 1.0000 |
| 3.2500 | 1.0000 |
| 3.3000 | 1.0000 |
| 3.3500 | 1.0000 |
| 3.4000 | 1.0000 |
| 3.4500 | 1.0000 |
| 3.5000 | 1.0000 |
| 3.5500 | 1.0000 |
| 3.6000 | 1.0000 |
| 3.6500 | 1.0000 |
| SECTION 4 | |
| 3.6838 | 1.0000 |
| 3.7000 | 1.0015 |
| 3.7500 | 1.0243 |
| 3.8000 | 1.0745 |
| 3.8500 | 1.1514 |
| 3.900 | 1.2540 |
| 3.9500 | 1.3807 |
| 4.0000 | 1.5299 |
| 4.0500 | 1.6995 |
| 4.1000 | 1.8871 |
| 4.1500 | 2.0901 |
| 4.2000 | 2.3058 |
| 4.2500 | 2.5310 |
| 4.3000 | 2.7628 |
| 4.3500 | 2.9979 |
| 4.4000 | 3.2330 |
| 4.4500 | 3.4648 |
| 4.5000 | 3.6902 |
| 4.5500 | 3.9061 |
| 4.6000 | 4.1094 |
| 4.6500 | 4.2973 |
| 4.7000 | 4.4672 |
| 4.7500 | 4.6168 |
| 4.8000 | 4.7440 |
| 4.8500 | 4.8469 |
| 4.9000 | 4.9243 |
| 4.9500 | 4.9750 |
| 5.0000 | 4.9984 |
| SECTION 5 | |
| 5.0171 | 5.0000 |
| 5.0500 | 5.0000 |
| 5.1000 | 5.0000 |
| 5.1500 | 5.0000 |
| 5.2000 | 5.0000 |
| 5.2500 | 5.0000 |
| 5.3000 | 5.0000 |
| 5.3500 | 5.0000 |
| 5.4000 | 5.0000 |
| 5.4500 | 5.0000 |
| 5.5000 | 5.0000 |
| 5.5500 | 5.0000 |
| 5.6000 | 5.0000 |
| 5.6500 | 5.0000 |
| 5.7000 | 5.0000 |
| 5.7500 | 5.0000 |
| 5.8000 | 5.0000 |
| 5.8500 | 5.0000 |
| 5.9000 | 5.0000 |
| 5.9500 | 5.0000 |
| 6.0000 | 5.0000 |
| 6.0500 | 5.0000 |
| 6.1000 | 5.0000 |
| 6.1500 | 5.0000 |
| 6.2000 | 5.0000 |
| 6.2500 | 5.0000 |
| 6.3000 | 5.0000 |
| 6.3500 | 5.0000 |
| 6.4000 | 5.0000 |
| 6.4500 | 5.0000 |
| 6.5000 | 5.0000 |
| 6.5500 | 5.0000 |
| 6.6000 | 5.0000 |
| 6.6500 | 5.0000 |
| 6.7000 | 5.0000 |
| 6.7500 | 5.0000 |
| 6.8000 | 5.0000 |
| 6.8500 | 5.0000 |
| 6.9000 | 5.0000 |
| 6.9500 | 5.0000 |
| 7.0000 | 5.0000 |
| 7.0500 | 5.0000 |
| 7.1000 | 5.0000 |
| 7.1500 | 5.0000 |
| 7.2000 | 5.0000 |
| 7.2500 | 5.0000 |
| 7.3000 | 5.0000 |
| 7.3500 | 5.0000 |
| 7.4000 | 5.0000 |
| 7.4500 | 5.0000 |

TABLE 1-continued

Variable Pitch Thread

| X-axis (inches) | Thread Rate (threads/in) |
|---|---|
| 7.5000 | 5.0000 |
| 7.5500 | 5.0000 |
| 7.6000 | 5.0000 |
| 7.6500 | 5.0000 |
| 7.7000 | 5.0000 |
| 7.7500 | 5.0000 |
| 7.8000 | 5.0000 |
| 7.8500 | 5.0000 |
| 7.9000 | 5.0000 |
| 7.9500 | 5.0000 |
| 8.0000 | 5.0000 |
| 8.0500 | 5.0000 |
| 8.1000 | 5.0000 |
| 8.1500 | 5.0000 |
| 8.2000 | 5.0000 |
| 8.2171 | 5.0000 |

Section Pitch Equations

| SECTION | PITCH EQUATION | RANGE |
|---|---|---|
| Lead In | P0 = 32 | 0<=X<=1.25 |
| 1 | P1=4.11−0.91COS[((2*pi)/1/4.11))*(X−1.25))] | 1.25<=X<=1.25+(1/4.11) |
| 2 | P2=2.1+1.1COS[(pi/2.5/2.1))*(X−(1/4.11)−1.25)] | 1.493<=X<=1.25+(1.4.11)+(2.5/2.1) |
| 3 | P3=1 | 2.684<=X<=1.25+(1.4.11)+(2.5/2.1)+1 |
| 4 | P4=3+2COS[(pi/(2.5/2.1))*(X−1−(2.5/2.1)+4/3)−(1/4.11)−1.25)] | 3.684<=X<=1.25+(1.4.11)+(2.5/2.1)+1+(4/3) |
| 5 | P5=5 | 5.107<=Z<=1.25+(1/4.11)+2.5/2.1)+1+(4/3)+3.2 |

The present invention with the variable pitch inventory screw 10 enables the rapid expansion and contraction of the distance between adjacent packages 50 propagating along a variable pitch trough 12 between the threads 14. As the variable pitch inventory screw 10 rotates axially, the packages 50, hanging vertically from the horizontally positioned inventory screw 10, will propagate along its length. As the pitch expands, the packages 50 separate and as the pitch contracts, the packages 50 come closer together. The variable pitch inventory screw 10 can be used to withdraw packages 50 from the screw or rods 22 of a storage device 20 or the variable pitch inventory screw 10 can be a loading screw so that the surface 49 of the packages 50 can be scanned by a scanner 30 when packages 50 are being loaded on and unloaded from the storage device 20. The variable pitch inventory screw 10 generates a controlled (controllable) gap between the packages 50 with the added advantage of orienting the packages 50 toward the scanner 30 from the indicia 51 on the surface of the packages 50 for optimal data acquisition (see FIG. 9).

The variable pitch inventory screw 10 can be used in a similar manner as described above, by mating the end 64 of the variable pitch inventory screw 10 with the end 63 of the storage device screw 22 and then rotating the screws 10 and 22 to move the packages 50 along the variable pitch inventory screw 10 so that the surfaces 49 of the packages 50 can be scanned and the information from the indicia 51 on the packages 50 can be recorded. The variable pitch inventory screw 10 provides a controlled window for scanning the surface 49 of the packages 50 so that information from the bar code 51 on the package 50 can be read. When the storage device screw 22 is completely unloaded onto the variable pitch inventory screw 10, and the packages 50 are scanned, the screws 10 and 22 are rotated in a reverse direction to move the packages 50 back onto the storage device screw 22. This inventorying process can then be repeated for the balance of the screw or rods 22 of the storage device 20. The variable pitch inventory screw 10 may be tailored to give almost any spacing profile by varying the pitch of the variable pitch inventory screw 10.

What is claimed is:

1. A method of inventorying packages on a storage device comprising the steps of:

removing packages from the storage device with a screw by rotating said screw about its axis so that an end of said screw enters holes in said packages to withdraw said packages from the storage device between threads of said screw, said screw having a variable pitch that causes said packages to spread out from each other and turn to expose indicia on the surface of said packages to be scanned as the thread pitch of said screw expands;

scanning a surface of said packages to read indicia on said surfaces, said indicia containing information about the contents of said package; and recording information obtained from the indicia on said packages.

2. The method of claim 1, further comprising the step of returning said packages to said storage device by rotating said screw about its axis in the opposite direction that said screw was rotated to withdraw said packages from said storage device.

3. The method of claim 1 further comprising the step of driving an edge of each of said packages on said screw against an obstruction to thereby fan out said packages so that a surface of said packages is exposed to enable the indicia on the surface to be scanned.

4. The method of claim 1 wherein said indicia is a bar code.

5. A package inventorying apparatus for a package storage device that stores packages having holes therethrough comprising:

a variable pitch screw having a plurality of threads, wherein the variable pitch of said screw causes said packages to spread out from each other and turn to expose indicia on the surface of said packages to be scanned as the thread pitch of said screw expands, said variable pitch screw being sized to fit into the holes in said packages to transfer said packages along the length of said variable pitch screw when said variable pitch screw is rotated about its axis;

a motor connected to said variable pitch screw to rotate said variable pitch screw about its axis; and a scanner to read indicia on a surface of said packages, said indicia containing information about the contents in said packages.

6. The apparatus of claim 5 wherein said variable pitch screw has a helical trough of varying pitch along the length of said screw.

7. The apparatus of claim 5 wherein said indicia is a bar code.

8. A package transfer system comprising:

a storage device that stores packages of items;

at least one variable pitch screw in association with said storage device, and wherein the variable pitch of said screw causes the packages to spread out from each other and turn to expose indicia on the surface of said packages to be scanned as the thread pitch of said screw expands; and a package adapted to be transported along the length of said variable pitch screw when said screw is rotated about its axis as said package depends from said variable pitch screw.

9. The system of claim 8 further comprising a scanner to read indicia on a surface of said packages, said indicia containing information about the contents in said package.

10. The system of claim 8 wherein said indicia is a bar code.

11. The system of claim 8 wherein said variable pitch screw has a helical trough of varying pitch along the length of said screw.

* * * * *